US012141831B2

(12) United States Patent
Unnerstall

(10) Patent No.: US 12,141,831 B2
(45) Date of Patent: *Nov. 12, 2024

(54) PAYMENT CARD TRANSACTION SYSTEMS AND METHODS WITH INSTANT GEOGRAPHIC MERCHANT INCENTIVE NOTIFICATION

(71) Applicant: MASTERCARD INTERNATIONAL INCORPORATED, Purchase, NY (US)

(72) Inventor: Rick Unnerstall, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/183,075

(22) Filed: Mar. 13, 2023

(65) Prior Publication Data

US 2023/0214874 A1 Jul. 6, 2023

Related U.S. Application Data

(63) Continuation of application No. 15/800,492, filed on Nov. 1, 2017, now Pat. No. 11,605,105.

(51) Int. Cl.
G06Q 30/02 (2023.01)
G06Q 20/02 (2012.01)
(Continued)

(52) U.S. Cl.
CPC ......... *G06Q 30/0229* (2013.01); *G06Q 20/02* (2013.01); *G06Q 20/10* (2013.01);
(Continued)

(58) Field of Classification Search
CPC .... G06Q 30/0229; G06Q 20/02; G06Q 20/10; G06Q 20/102; G06Q 20/14;
(Continued)

(56) References Cited

U.S. PATENT DOCUMENTS

| 9,412,118 | B2 | 8/2016 | Loomis |
| 9,665,874 | B2 | 5/2017 | Chau |
| 9,684,909 | B2 | 6/2017 | Baker |
| 9,697,529 | B2 | 7/2017 | Fischer |
| 9,715,700 | B2 | 7/2017 | Chomsky |
| 9,721,262 | B2 | 8/2017 | Krone |
| 9,741,052 | B2 | 8/2017 | Loomis |
| 9,785,963 | B2 | 10/2017 | Loomis |
| 10,949,888 | B1 * | 3/2021 | Brock ................ G06Q 30/0271 |

(Continued)

FOREIGN PATENT DOCUMENTS

KR 20170017637 A * 2/2017 ............. G06Q 20/36

OTHER PUBLICATIONS

Pasquet et al., Pay2You Places: The mobile payment with geo-location, 2014, 2014 International Conference on Collaboration Technologies and Systems (CTS), pp. 211-216 (Year: 2014).*

*Primary Examiner* — John Van Bramer
(74) *Attorney, Agent, or Firm* — Armstrong Teasdale LLP

(57) ABSTRACT

An electronic payment card processing system and method includes a host computing device having at least one processor in communication with a memory device and a multi-party payment processing network for processing payment-by-card transactions. The host computing device is configured to identify a first payment-by-card transaction between an enrolled cardholder and a first enrolled merchant that is processed over the multi-party payment processing network, identify at least one affiliated merchant of the first enrolled merchant; and send an affiliate incentive offer for the at least one affiliated merchant to the enrolled cardholder.

20 Claims, 7 Drawing Sheets

(51) Int. Cl.
    *G06Q 20/10*     (2012.01)
    *G06Q 20/14*     (2012.01)
    *G06Q 20/34*     (2012.01)
    *G06Q 20/36*     (2012.01)
    *G06Q 20/38*     (2012.01)
    *G06Q 30/0226*     (2023.01)

(52) U.S. Cl.
    CPC ............ *G06Q 20/102* (2013.01); *G06Q 20/14* (2013.01); *G06Q 20/351* (2013.01); *G06Q 20/36* (2013.01); *G06Q 20/363* (2013.01); *G06Q 20/387* (2013.01)

(58) Field of Classification Search
    CPC .... G06Q 20/351; G06Q 20/36; G06Q 20/363; G06Q 20/387
    See application file for complete search history.

(56) References Cited

U.S. PATENT DOCUMENTS

| | | | |
|---|---|---|---|
| 2007/0288312 A1 | 12/2007 | Wang | |
| 2013/0046602 A1 | 2/2013 | Grigg | |
| 2013/0080239 A1* | 3/2013 | Okerlund | G06Q 20/387 705/14.27 |
| 2014/0058796 A1 | 2/2014 | Getchius | |
| 2014/0279123 A1* | 9/2014 | Harkey | G06Q 30/0619 705/26.1 |
| 2015/0176998 A1* | 6/2015 | Huang | H04W 4/021 701/400 |
| 2015/0348028 A1* | 12/2015 | Unser | G06Q 40/08 705/44 |
| 2017/0109779 A1 | 4/2017 | Loomis | |
| 2017/0178174 A1* | 6/2017 | Mitchell | G06Q 30/0226 |
| 2017/0262872 A1 | 9/2017 | Fischer | |

* cited by examiner

PAYMENT CARD TRANSACTION SYSTEMS AND METHODS WITH INSTANT GEOGRAPHIC MERCHANT INCENTIVE NOTIFICATION

CROSS REFERENCE TO RELATED APPLICATIONS

This application is a continuation of U.S. patent application Ser. No. 15/800,492, filed Nov. 1, 2017, entitled "PAYMENT CARD TRANSACTION SYSTEMS AND METHODS WITH INSTANT GEOGRAPHIC MERCHANT INCENTIVE NOTIFICATION", the disclosure of which is incorporated herein by reference in its entirety.

BACKGROUND

This disclosure relates generally to electronic payment systems for payment-by-card transactions, and more specifically to electronic payment card systems and methods having transaction-based and location-based merchant incentive notification.

Electronic payment card processing systems are in widespread use to process transactions between a payment card holder, a merchant, an acquirer bank, and an issuing bank. The transaction may involve the physical payment card itself at a point-of-sale terminal, a device associated with a payment card (or an account of a payment card) that includes payment card information and digital payment capability (e.g., a smart phone device including a digital wallet), or manually entered payment card information via another device such as a computer device interfacing with a merchant online. Sophisticated multi-party payment card processing systems are known to process payment card transactions, confirm authorized charges, manage payments and transfer of funds, confirm payment status, and compute available credit balances.

When a cardholder uses a payment card (e.g., a credit card or a debit card) to initiate a transaction to purchase goods or services from a merchant, an acquiring bank (i.e., the merchant's bank) will typically reimburse the merchant for the transaction. The acquiring bank will then settle those funds with an issuing bank of the account corresponding to the payment card by presenting transaction data, associated with the transaction, to a payment processor. In a process known as clearing, transaction data is communicated from the acquiring bank through the payment processor to the issuing bank. After clearing, settlement of the final payment occurs via the payment processor. Settlement is a process used to exchange funds between the acquiring bank and the issuing bank for the net value of a batch of all monetary transactions that have cleared for that processing day.

Much transaction data is captured by such multi-party payment card processing systems that is presently underutilized in some aspects. Merchants and cardholders alike may benefit from information that can be gleaned from a multi-party payment card processing system that can promote and incentivize cardholder transactions with merchants. Improvements are accordingly desired.

BRIEF DESCRIPTION

In one aspect, the disclosure provides an electronic payment card processing system including at least one host computing device including at least one processor in communication with a memory device and a multi-party payment processing network for processing payment-by-card transactions. The at least one host computing device is configured to: identify a first payment-by-card transaction between an enrolled cardholder and a first enrolled merchant that is processed over the multi-party payment processing network; identify at least one affiliated merchant of the first enrolled merchant; and send an affiliate incentive offer for the at least one affiliated merchant to the enrolled cardholder.

In another aspect, the disclosure provides a method for electronically notifying a cardholder of a location-based affiliate merchant offer when making a payment card transaction with an enrolled merchant is provided. The method is implemented by at least one host computing device including at least one processor in communication with a memory device and a multi-party payment processing network for processing payment-by-card transactions. The method includes: identifying, with the at least one host computing device, a first payment-by-card transaction between an enrolled cardholder and a first enrolled merchant that is processed over the multi-party payment processing network; identifying at least one affiliated merchant of the first enrolled merchant; and sending an affiliate incentive offer for the at least one affiliated merchant to the enrolled cardholder.

In another aspect, the disclosure provides a non-transitory computer readable medium that includes computer executable instructions for notifying a cardholder of a location-based affiliate merchant offer when making a payment card transaction with an enrolled merchant, wherein when executed by at least one host computing device having at least one processor in communication with a memory device and a multi-party payment processing system, the computer executable instructions cause the at least one host computing device to: identify a first payment-by-card transaction between an enrolled cardholder and a first enrolled merchant that is processed over the multi-party payment processing network; identify at least one affiliated merchant of the first enrolled merchant; and send an affiliate incentive offer for the at least one affiliated merchant to the enrolled cardholder.

DETAILED DESCRIPTION OF THE DISCLOSURE

Figure 1:
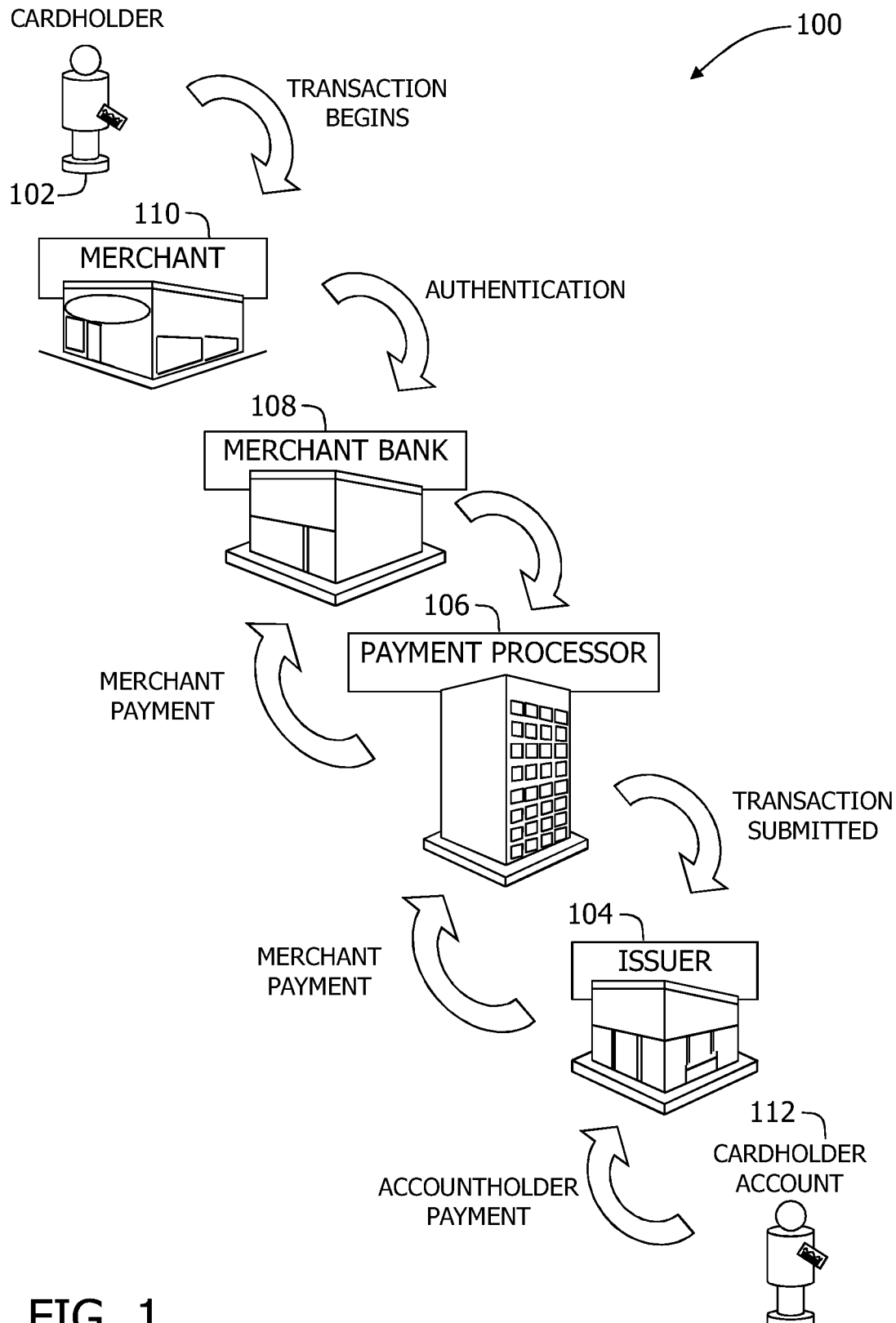
FIG. 1 is a schematic diagram illustrating an exemplary multi-party payment network system for processing payment card transactions.

The following detailed description illustrates embodiments of the disclosure by way of example and not by way of limitation. The description enables one skilled in the art to make and use the disclosure, describes several embodiments, adaptations, variations, alternatives, and uses of the disclosure, including what is presently believed to be the best mode of carrying out the disclosure.

The systems and methods of the disclosure facilitate a transaction-based system and method for crowd-sourced participating merchants within predefined geofenced areas to drive sales with enrolled cardholders by leveraging payment-by-card transaction data obtained via a multi-party payment card network. The crowd-sourced participating merchants may be enrolled using the systems and methods of the disclosure to leverage the payment-by-card transaction data according to mutually agreed upon terms within geographic limits defined by the respective geofenced areas. Automated inventive programs including instant direct notification and invitation to enrolled cardholders to patronize other participating merchants in the geographic area are realized for the benefit of cardholders and merchants.

The systems and methods of the disclosure relate to transactions happening within the geofenced areas including participating merchants that are enrolled in the system. Upon completion of an initial transaction between a cardholder and a first participating merchant in a given geofenced area, as determined by the transaction data processed over the multi-party payment card network and the location of the first participating merchant and/or the cardholder's location, participating cardholders enrolled in the system may receive a notice and invitation generated by the system to visit a second participating merchant within the geofenced area. The generated notice and invitation to the cardholder includes a special incentive offer that may be redeemed by the enrolled cardholder at the location of the second participating merchant.

If the cardholder accepts and redeems the special incentive offer at the second participating merchant, the first participating merchant receives an affiliate fee from the second participating merchant as consideration for allowing the notice and invitation to the cardholder to be generated based on and in response to the initial payment-by-card transaction between the cardholder and the first participating merchant. The affiliate fee is processed by the system and presented to the payment network in an automated manner according to the terms of an affiliate agreement made between the first and second participating merchants.

The affiliate fee that is processed by the system is dynamically determined and may vary depending on the specifics of the initial transaction with the first participating merchant and the subsequent transaction with the second merchant. Because of the dynamic determination of the affiliate fee, the value of the affiliate fee may vary from transaction to transaction. In contemplated examples, the dynamic affiliate fee determined and processed through the system depends on parameters such as time proximity between the generated notice and invitation and the redemption of the offer by the cardholder at the second participating merchant, actual geographic proximity of the second participating merchant relative to the first participating merchant, and/or the relative market segments of the first and second participating merchants. The dynamic parameters of the affiliate fee are applied by the system according to the applicable affiliate agreement made between the first and second participating merchants.

In the system and methods of the disclosure, participating merchants can beneficially earn revenue from one another via payment-by-card transactions with the same cardholders in a manner that has not conventionally been possible. Aside from enrolling on the system and establishing affiliate agreements with other participating merchants, merchants need not do anything but accept (and pay) applicable affiliate fees. Reports may be generated by the system including offers generated, offers redeemed, affiliated fees paid, and affiliate fees collected on a periodic basis or on demand.

Likewise, apart from enrolling in the system, cardholders need not do anything but use their payment cards as they normally would. When cardholders make a payment-by-card transaction with a participating merchant, they beneficially receive specific notice of other participating merchants and available offers in the geofenced area that may be of specific interest to them. When such notices are received directly with a mobile device of the cardholder (e.g., a smartphone), and even more specifically when such notices are received as a notification via a digital wallet service on the mobile device, cardholders may conveniently take advantage of special offers in a coupon-less manner with great convenience while simultaneously being advised and educated of other merchants and their locations that may otherwise have been unknown until the notice was received. Especially for cardholders that are unfamiliar with the goefenced area that they happen to be in, the cardholder experience may be considerably enhanced, with the participating merchants and inventive offer generated by the system of the disclosure operatively providing a guided experience between different participating merchants and respective locations that are geographically proximate to one another.

In one embodiment, the disclosure provides an electronic payment card processing system including at least one host computing device including at least one processor in communication with a memory device and a multi-party payment processing network for processing payment-by-card transactions. The at least one host computing device is configured to: identify a first payment-by-card transaction between an enrolled cardholder and a first enrolled merchant that is processed over the multi-party payment processing network; identify at least one affiliated merchant of the first enrolled merchant; and send an affiliate incentive offer for the at least one affiliated merchant to the enrolled cardholder.

The at least one host computing device is further configured to: identify a second payment-by-card transaction between an enrolled cardholder and the at least one affiliated merchant that is processed over the multi-party payment processing network; and dynamically determine an affiliate fee payable from the at least one affiliated merchant to the first enrolled merchant. The at least one host computing device is also configured to process the affiliate fee over the multi-party payment processing network. The host computing device is configured to dynamically determine the affiliate fee based on at least one of: a time interval between the first payment-by-card transaction and the second payment-by-card transaction, a geographic distance between the first merchant and the at least one affiliate merchant, or a market segment of the first payment-by-card transaction and the second payment-by-card transaction.

The host computing device is also configured to, enroll cardholders, enroll merchants, and accept dynamic affiliate merchant fee parameters. The system is configured to retrieve dynamic affiliate merchant fee parameters within a predetermined geofenced area around the location of the first merchant. The system is also configured to determine the location of the cardholder, and send a location-based affiliate incentive offer for the at least one affiliated merchant to the enrolled cardholder. The at least one host computing device is configured to send the affiliate incentive offer to a cardholder device. The cardholder device may include a digital wallet, the affiliate incentive offer may be a notification message presented to the cardholder via the digital wallet.

In another embodiment of the disclosure, a method for electronically notifying a cardholder of a location-based affiliate merchant offer when making a payment card transaction with an enrolled merchant is provided. The method is implemented by at least one host computing device including at least one processor in communication with a memory device and a multi-party payment processing network for processing payment-by-card transactions. The method includes: identifying, with the at least one host computing device, a first payment-by-card transaction between an enrolled cardholder and a first enrolled merchant that is processed over the multi-party payment processing network; identifying at least one affiliated merchant of the first enrolled merchant; and sending an affiliate incentive offer for the at least one affiliated merchant to the enrolled cardholder.

The method further includes: identifying a second payment-by-card transaction between an enrolled cardholder and the at least one affiliated merchant that is processed over the multi-party payment processing network; and dynamically determining, with the at least one host computing device, an affiliate fee payable from the at least one affiliated merchant to the first enrolled merchant. The method also includes processing the affiliate fee over the multi-party payment processing network. The method may include dynamically determining the affiliate fee based on at least one of: a time interval between the first payment-by-card transaction and the second payment-by-card transaction, a geographic distance between the first merchant and the at least one affiliate merchant, or a market segment of the first payment-by-card transaction and the second payment-by-card transaction.

The method may additionally include enrolling cardholders, enrolling merchants, and accepting dynamic affiliate merchant fee parameters. The method may include retrieving dynamic affiliate merchant fee parameters within a predetermined geofenced area around the location of the first merchant, and may include determining the location of the cardholder, and sending a location-based affiliate incentive offer for the at least one affiliated merchant to the enrolled cardholder. The method may include sending the affiliate incentive offer to a cardholder device at the determined location, and may further include generating a notification message to the cardholder via a digital wallet service.

In another embodiment of the disclosure, a non-transitory computer readable medium that includes computer executable instructions for notifying a cardholder of a location-based affiliate merchant offer when making a payment card transaction with an enrolled merchant, wherein when executed by at least one host computing device having at least one processor in communication with a memory device and a multi-party payment processing system, the computer executable instructions cause the at least one host computing device to: identify a first payment-by-card transaction between an enrolled cardholder and a first enrolled merchant that is processed over the multi-party payment processing network; identify at least one affiliated merchant of the first enrolled merchant; and send an affiliate incentive offer for the at least one affiliated merchant to the enrolled cardholder.

The computer executable instructions may further cause the at least one host computing device to: identify a second payment-by-card transaction between the enrolled cardholder and the at least one affiliated merchant; and dynamically determine an affiliate fee payable to the first enrolled merchant by the at least one affiliated merchant.

The technical problems addressed by the payment card processing systems and methods of the disclosure include at least one of: (i) improving a processing of payment-by-card transactions in a multi-party payment card network; (ii) inability to localize payment-by-card transaction data for the benefit of a cardholder; (iii) inability to coordinate payment-by-card transactions between different merchants in a selected geographic area; (iv) inability to detect actual location of the cardholder to determine nearby merchants for possible payment-by-card transactions; (v) inability to directly inform a cardholder of available merchant offers for possible payment-by-card transactions within a geofenced area; (vi) inability of merchants to communicate with cardholder customers of other merchants; (vii) inability to efficiently process agreements between merchants with respect to payment-by-card transactions; (viii) inability to automate a dynamic affiliate fee payment structure for payment-by-card transactions between the same cardholders but different merchants; and (ix) inability of merchants to electronically share at least a portion of payment-by-card transaction data with other local merchants as payment-by-card transactions are made.

The payment card processing systems and methods of the disclosure may be implemented using computer programming or engineering techniques including computer software, firmware, hardware, or any combination or subset thereof, wherein the technical effects may be achieved by: (i) electronic identification of payment-by-card transactions according to geographic location; (ii) electronically assisting a cardholder in real-time as payment-by-card transactions are made according to cardholder location; (iii) electronic coordination of payment-by-card transactions between different merchants in a selected geographic area; (iv) electronic identification and notification to cardholders of nearby merchants for possible payment-by-card transactions; (v) electronically providing information to cardholders of available merchant offers for possible payment-by-card transactions within a geofenced area; (vi) electronically providing cross-merchant communication with cardholder customers of different merchants; (vii) automated compliance with affiliate merchant agreements with respect to payment-by-card transactions of the same cardholders; (viii) automated determination of a dynamic affiliate fee payment structure for payment-by-card transactions between the same cardholders but different merchants; and (ix) automated electronic access to at least a portion of payment-by-card transaction data with other local merchants as payment-by-card transactions are made.

The resulting technical benefits achieved by the payment card processing systems and methods include at least one of: (i) electronic leveraging of payment-by-card transaction data to improve cardholder activity and experience in specific geographic locations; (ii) electronically informing a cardholder of other merchants in the area as payment-by-card transactions are made according to actual cardholder location in real time; (iii) facilitating different merchants within a selected geographic area to electronically coordinate payment-by-card transactions with the same cardholder in the geographic area as payment-by-card transactions are being made; (iv) electronically informing cardholders of nearby merchants for possible payment-by-card transactions while they are in the geographic area based on at least one payment-by-card transaction within the geographic area; (v) electronically identifying available merchant offers for possible payment-by-card transactions within a geofenced area by the same cardholder; (vi) electronically facilitating cross-merchant communication with cardholder customers of different merchants; (vii) electronically administrating affiliate merchant agreements with respect to payment-by-card transactions of the same cardholders; (viii) automatically determining and processing a dynamic affiliate fee payment value for payment-by-card transactions between the same cardholders but different merchants; and (ix) electronically automating a real time electronic sharing of at least a portion of payment-by-card transaction data with other local merchants as payment-by-card transactions are being made.

In one embodiment, a computer program is provided, and the program is embodied on a computer-readable medium. In an example embodiment, the system may be executed on a single computer system, without requiring a connection to a server computer. In a further example embodiment, the system may be run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Apple Inc. located in Cupertino, CA). In yet a further embodiment, the system is run on a Mac OS® environment (Mac OS is a registered trademark of Apple Inc. located in Cupertino, CA). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer-readable medium and utilizes a Structured Query Language (SQL) with a client user interface front-end for administration and a web interface for standard user input and reports. In another embodiment, the system is web enabled and is run on a business entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Washington). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus, are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the system and methods described herein. (Oracle is a registered trademark of Oracle Corporation, Redwood Shores, CA; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, any type of virtual card (e.g. virtual cards generated by issuers and/or third party processors via mobile bank or desktop apps) and/or any other device that may hold payment account information, such as mobile phones, Smartphones, personal digital assistants (PDAs), key fobs, digital wallets, and/or computers. Each type of transactions card can be used as a method of payment for performing a transaction. As used herein, the term "payment account" is used generally to refer to the underlying account with the transaction card. In addition, cardholder card account behavior can include but is not limited to purchases, management activities (e.g., balance checking), bill payments, achievement of targets (meeting account balance goals, paying bills on time), and/or product registrations (e.g., mobile application downloads).

As used herein, the term "transaction data" refers to data that includes at least a portion of a cardholder's account information (e.g., cardholder name, account identifier, credit line, security code, and/or expiration data) and at least a portion of purchase information (e.g., price, a type of item and/or service, SKU number, item/service description, purchase date, and/or confirmation number) supplied by a merchant from which the cardholder is making a purchase.

Problems and challenges of cardholders and merchants conducting transactions in a conventional manner are discussed below, followed by exemplary systems and methods that overcome such problems and challenges.

While payment cards afford great convenience to cardholders in conducting transactions with merchants, such convenience is generally limited by a cardholder's awareness of area merchants wherever the cardholder happens to be geographically. Many cardholders regularly visit certain merchants, and certain merchants are well recognized even while traveling, but less familiar merchants that may be nearby often go un-noticed. Whether at home or away, it is sometimes difficult for a cardholder to truly appreciate their merchant options, and as such many potentially desirable transactions with area merchants are never considered by certain cardholders. Also, discounts, special offers and incentives of area merchants that may be of interest to cardholders are never acted upon due primarily to a lack of awareness, especially so for travelling cardholders or cardholder visitors to geographic areas having some degree of unfamiliarity, if not total unfamiliarity.

From the merchant perspective, individual marketing and branding efforts tend to be rewarded by cardholders in their market segments, and so do discounts and incentive offers if they can be effectively communicated to (or noticed by) such cardholders. There are practical limits to doing so, however. Ads, coupons and mailers sometimes have a tendency to get lost in a host of competing offers that cardholders may receive, and in the case of a traveling or visiting cardholder in an unfamiliar location some effort is typically required just to ascertain whether such offers to relate to nearby merchants or not. Also presenting coupons to merchants at the time of a transaction can be a nuisance to certain cardholders who may not be able quickly locate them when desired. While shopping areas can be designed, and merchant locations can be selected, to obtain some cross-customer traffic from merchant to merchant, merchants generally lack practical ability to work together to attract and complete transactions with the same cardholders. Typically, nearby merchants cannot identify or communicate with a cardholder that is in the area but has yet to visit their specific store.

In view of the above, barriers exist to fully meeting the demands of the marketplace from both a cardholder and merchant perspective to mutually understand a geographic proximity of cardholders and merchants in the same area, or to mutually appreciate and capitalize on offers and incentives that may be available from different merchants. The methods and systems described below overcome such difficulties and beneficially allow convenient, instant notifications to be sent to cardholders regarding other merchants within a geofenced area, including available incentive offers from the other merchants, when a cardholder completes a payment-by-card transaction within the geofenced area that the cardholder is actually in at the time of the transaction.

The incentive offers may include generally discounts for any purchase made, specific discounts for certain items available from a nearby merchant, financing offers (e.g., 0% interest offers for specified purchases for a set period of time), or any other promotional effort undertaken to attract new customers or repeat customers. The incentive offers may be sent to a smart phone devices being carried by cardholders at the time of completion of an initial transaction. Contact, address and navigational directions may be linked to or included in the incentive offers, and the incentive offers may in some cases include an electronic bar code, a QR code, or another code or machine readable element that may be scanned by a point of sale device of the nearby retailer when the incentive offer is redeemed to ensure that the discount or other special offer is applied to an eligible purchase. Information corresponding to the machine readable element included in the offer may be communicated to the multi-party payment card processing network as part of the transaction data to identify redeemed offers and determine and process affiliate merchant fee payments as explained below.

By virtue of the location-based incentive offers to other merchants as payment-by-card transactions are completed, whether or not cardholders are already familiar with the geofenced area concerned, nearby merchants may be specifically identified to cardholders and incentive offers presented to cardholders for maximum convenience. Likewise, a crowd-sourced network of participating merchants with a dynamic, revenue sharing arrangement between affiliated merchants may be established and administered automatically by the methods and systems of the disclosure as further described below.

FIG. 1 is a schematic diagram illustrating an exemplary multi-party payment card processing system and network 100 for processing payment-by-card transactions. The present system and method relates to payment card processing network 100, such as a credit card payment network using the MasterCard® payment processor 106. MasterCard® payment processor 106 is a proprietary communications standard promulgated by MasterCard International Incorporated® for the exchange of financial transaction data between financial institutions that are registered with MasterCard International Incorporated®. (MasterCard is a registered trademark of MasterCard International Incorporated located in Purchase, New York). Embodiments described herein may also relate to digital payment services such as Masterpass by Mastercard or another digital wallet service for a mobile device such as a smartphone.

In payment card processing network 100, a financial institution, such as an issuing bank 104, issues a payment card, such as a credit card account or a debit card account, to a cardholder 102, who uses the payment card to tender payment for a purchase from a merchant 110. To accept payment with the payment card, merchant 110 must normally establish an account with a financial institution that is part of the financial payment system. This financial institution is usually called the "merchant bank" or the "acquiring bank" or simply "acquirer". When a cardholder 102 tenders payment for a purchase with a payment card (also known as a financial transaction card), merchant 110 requests authorization from merchant bank 108 for the amount of the purchase. The request may be performed over the telephone or via a website, but is oftentimes performed through the use of a point-of-sale terminal, which reads the cardholder's account information from the magnetic stripe on the payment card and communicates electronically with the transaction processing computers of merchant bank 108. Alternatively, merchant bank 108 may authorize a third party to perform transaction processing on its behalf. In this case, the point-of-sale terminal will be configured to communicate with the third party. Such a third party is usually called a "merchant processor" or an "acquiring processor."

Using payment processor 106, the computers of merchant bank 108 or the merchant processor will communicate with the computers of issuing bank 104 to determine whether the cardholder's account is in good standing and whether the purchase is covered by the cardholder's available credit line or account balance. Based on these determinations, the request for authorization will be declined or accepted. If the request is accepted, the transaction is given a bank network reference number, such as the Banknet Reference Number used by MasterCard International Incorporated®, an authorization code, and/or other transaction identifiers that may be used to identify the transaction.

The payment network may be configured to process authorization messages, such as ISO® 8583 compliant messages and ISO® 20022 compliant messages. As used herein, "ISO®" refers to a series of standards approved by the International Organization for Standardization (ISO is a registered trademark of the International Organization for Standardization of Geneva, Switzerland). ISO® 8583 compliant messages are defined by the ISO® 8583 standard which governs financial transaction card originated messages and further defines acceptable message types, data elements, and code values associated with such financial transaction card originated messages. ISO® 8583 compliant messages include a plurality of specified locations for data elements. ISO® 20022 compliant messages are defined by the ISO® 20022 standard. For example, ISO® 20022 compliant messages may include acceptor to issuer card messages (ATICA).

During the authorization process of the payment card processing system, the clearing process is also taking place. During the clearing process, merchant bank 108 provides issuing bank 104 with information relating to the sale. No money is exchanged during clearing. Clearing (also referred to as "first presentment") involves the exchange of data required to identify the cardholder's account 112 such as the account number, expiration date, billing address, amount of the sale, and/or other transaction identifiers that may be used to identify the transaction. Along with this data, banks in the United States also include a bank network reference number, such as the Banknet Reference Number used by MasterCard International Incorporated®, which identifies that specific transaction. When the issuing bank 104 receives this data, it posts the amount of sale as a draw against the available credit in the cardholder account 112 and prepares to send payment to the merchant bank 108.

When a request for authorization is accepted, the available credit line or available account balance of cardholder's account 112 is decreased. Normally, a charge is not posted immediately to a cardholder's account 112 because bankcard associations, such as MasterCard International Incorporated®, have promulgated rules that do not allow a merchant to charge, or "capture," a transaction until goods are shipped or services are delivered. When a merchant 110 ships or delivers the goods or services, merchant 110 captures the transaction by, for example, appropriate data entry procedures on the point-of-sale terminal. If a cardholder 102 cancels a transaction before it is captured, a "void" is generated. If a cardholder 102 returns goods after the transaction has been captured, a "credit" is generated.

After a transaction is captured, the transaction is settled between merchant 110, merchant bank 108, and issuing bank 104. Settlement refers to the transfer of financial data or funds between the merchant's account, merchant bank 108, and issuing bank 104 related to the transaction. Usually, transactions are captured and accumulated into a "batch," which is settled as a group.

Figure 2:
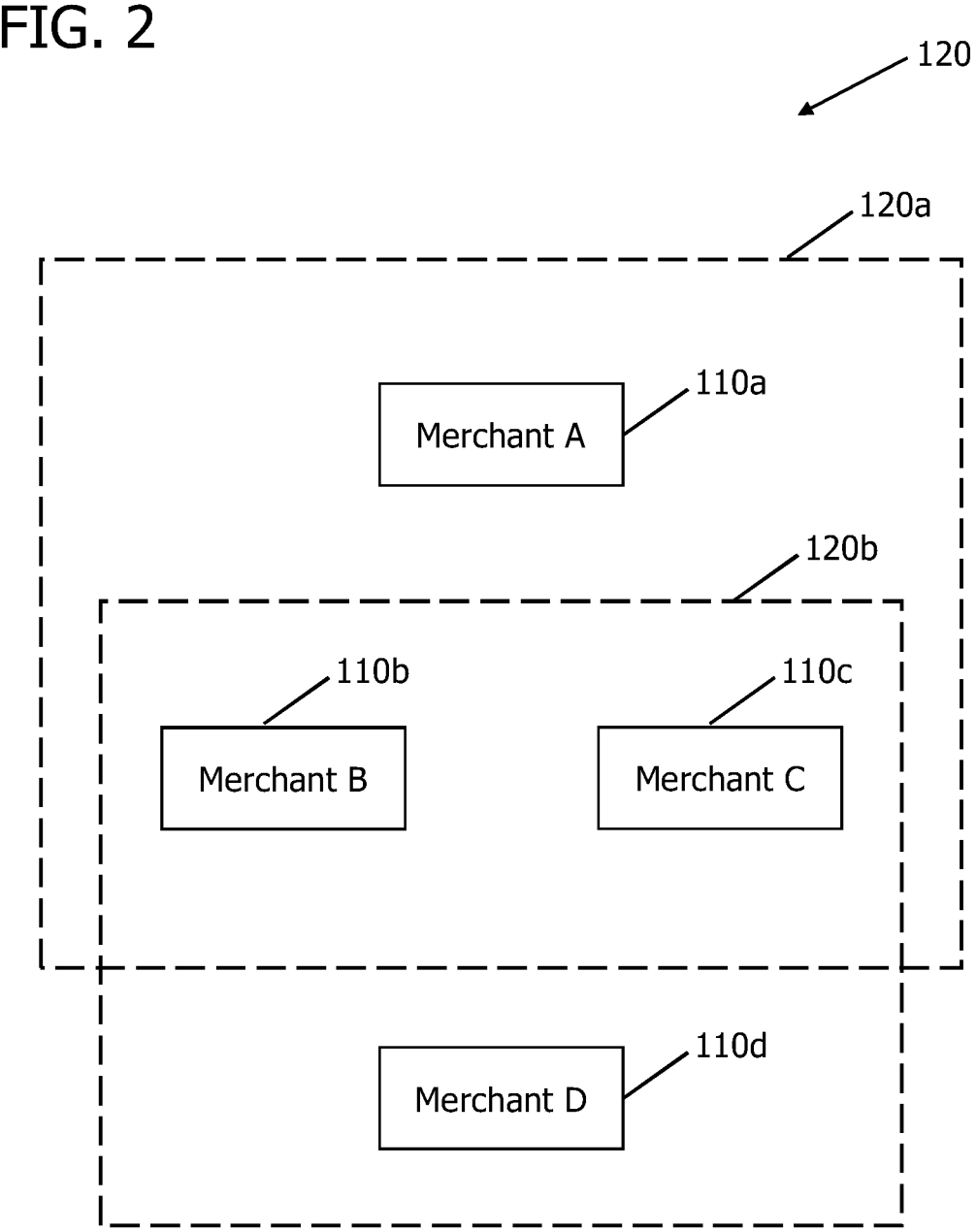
FIG. 2 schematically represents exemplary geofenced areas including participating merchants for the system of the disclosure.

FIG. 2 schematically represents a portion of a geofenced arrangement 120 illustrating a geographic aspect of the system of the disclosure that operates in tandem with the multi-party payment card processing network 100 described above. Multiple geofenced areas may be defined for different participating merchants for the system of the disclosure, with payment card transactions for one of the participating merchants in a geofenced area triggering notifications and offers regarding other participating merchants in the same geofenced area.

The geofenced arrangement 120 in the illustrated example includes two geofenced areas 120a, 120b that overlap in part. The geofenced area 120a includes a first group of merchants 110 each being a part of the multi-party payment card processing network 100 (FIG. 1), and in the simplified example of FIG. 2 such merchants include merchant 110a (Merchant A), merchant 110b (Merchant B) and merchant 110c (Merchant C). Likewise, the geofenced area 120b includes a second group of merchants 110 each being a part of the multi-party payment card processing network 100 (FIG. 1), and in the simplified example of FIG. 2 such merchants include merchant 110b (Merchant B), merchant 110c (Merchant C) and merchant 110d (Merchant D). Therefore, in this example, merchant 110b (Merchant B) and merchant 110c (Merchant C) are in both of the geofenced areas 120a, 120b while merchant 110a (Merchant A) and Merchant 110d (Merchant D) are in the respectively different geofenced areas 120a, 120b.

The geofenced areas 120a, 120b may be decided by the merchants involved in contemplated embodiments, and the selected geofenced area for one merchant may be the same or different from one another. The geofenced areas serve to define a geographic area surrounding the physical location of each participating merchant that is enrolled on the system.

For example, merchant 110a (Merchant A) may select a geofenced area 120a for purposes of the system that is defined by a 10 mile radius from its actual physical location, and following the example of FIG. 2, enrolled merchants 110b and 110c (Merchants B and C) are each within ten miles from merchant 110a (Merchant A) and are included in the geofenced area 120a. Other merchants will likely also be found in the geofenced area 120a and may enroll in the system of the disclosure as participating merchants relating to merchant 110a (Merchant A).

The example geofenced area 120a shown in FIG. 2 includes two enrolled and participating merchants 110b and 110c (Merchants B and C) that have entered into an affiliate agreements with Merchant A. As such, when an enrolled cardholder who is physically within the geofenced area 120a completes a payment-by-card transaction with merchant 110a (Merchant A), the cardholder receives a notice and offer generated by the system of merchants 110b and 110c (Merchants B and C) and associated offers made available by merchants 110b and 110c (Merchants B and C) that are within the geofenced area 120a.

Merchant 110d (Merchant D) in the example of FIG. 2, however, is more than 10 miles from merchant 110a (Merchant A) and is therefore not in the geofenced area 120a but instead is in another geofenced area 120b. Merchants 110b and 110c (Merchants B and C) are within ten miles of merchant 110d (Merchant D) and as such the geofenced area 120b also includes merchants 110b, 110c. Additional merchants will likely also be found in the geofenced area 120b and may enroll in the system of the disclosure as participating merchants relating to merchant 110d (Merchant D). Additional geofenced areas are possible that include merchant 110d (Merchant D), but not merchants 110b and 110c (Merchants B and C).

If merchants 110b, 110c and 110d (Merchants B, C, and D) have entered into an affiliate agreement, when an enrolled cardholder who is physically within the geofenced area 120b completes a payment-by-card transaction with merchant 110d (Merchant D), the cardholder receives a notice and offer generated by the system of merchants 110b and 110c (Merchants B and C) and associated offers made available by merchants 110*b* and 110*c* (Merchants B and C) that are within the geofenced area 120*b*.

It should be evident that from the perspective of merchants 110*b* or 110*c* (Merchants B or C) further geofenced areas are possible that may include all or some of the merchants shown (A, B, C and D) based on specific and relative locations of the merchants to one another and the geofenced areas selected by merchants 110*b* or 110*c* (Merchants B or C). Considerable flexibility is possible in defining relative geofenced areas for the participating merchants involved. As another example, if merchants 110*b* or 110*c* (Merchants B or C) selected a geofenced area having a five mail radius from their physical locations, those geofenced areas may or may not include Merchant A or Merchant D. As such, a cardholder moving from one geofenced area to another and making a payment-by-card transaction with each merchant may result in the generation of notices relating to different offers and different merchants. Practically any number of geofenced areas may be defined to include any number of merchants for purposes of the system of the disclosure.

The geofenced areas may be selected by each enrolled merchant or may be jointly decided via mutual agreement with affiliated merchants. Many ways to make the geofences known to the system are possible, including but not limited to a designated radius from a predetermined geographic point (e.g., the location of a specific merchant or a mid-point between two merchants) or by drawing a boundary on a map to form a geofenced area of any shape to include or exclude certain merchants or to include or exclude certain areas. Exclusion of a merchant may be desired in the case of a direct competitor merchant or for other business reasons, as may exclusion of certain areas in which a particular merchant may prefer not to solicit cardholders or may be prohibited from soliciting cardholders.

Figure 3:
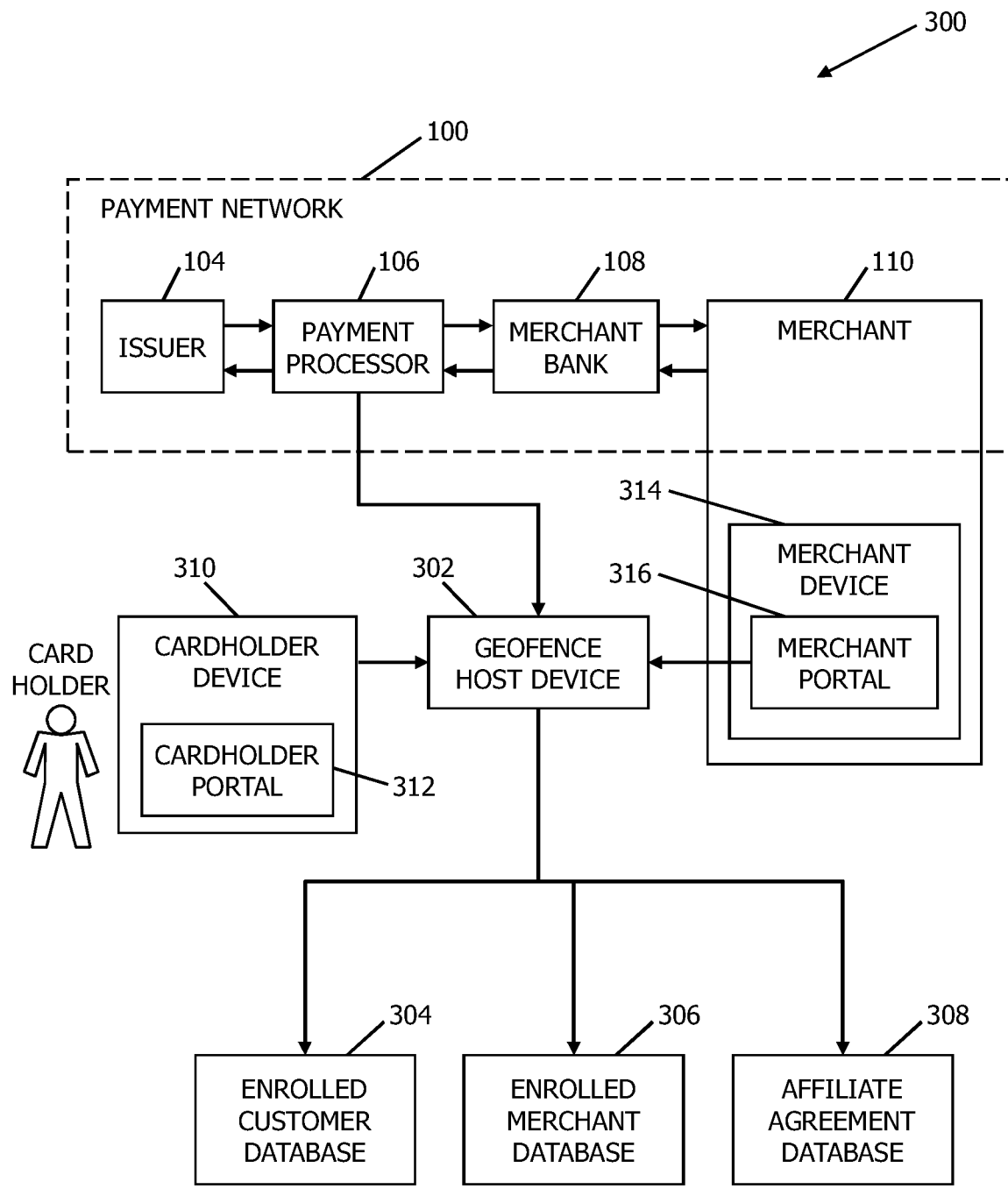
FIG. 3 is a schematic diagram illustrating an exemplary computer system of the disclosure including a geofence host computing device that facilitates geographic merchant incentive notification for participating merchants as the multi-party payment network system of FIG. 1 processes payment card transactions.

FIG. 3 is a schematic diagram illustrating an exemplary system 300 that facilities and coordinates the geofencing illustrated in FIG. 2 and related affiliate agreements between merchants.

The system 300 includes a geofence host computing device 302 in communication with the payment network 100 (FIG. 1) including the issuer 104, payment processor 106, merchant bank 108 and merchant 110, which represents any of the merchants 110*a*, 110*b*, 110*c* and 110*d* in FIG. 2. The geofence host computing device 302 is further in communication with an enrolled customer database 304, an enrolled merchant database 306, and an affiliate agreement database 308. A cardholder may further use a cardholder device 310 and cardholder portal 312 accessible via the cardholder device 310 to interact with the geofence host computing device 302, and the merchant 110 may use a merchant device 314 and merchant portal 316 accessible via the merchant device 314 to interact with the geofence host computing device 302.

A cardholder using the cardholder computing device 310 may enroll as a participating cardholder in the geofence host computing device 302. Enrollment may include acceptance of geofence service terms, preferred contact information (e.g., email, SMS text notification, push notification, notification via a digital wallet service, etc.) and preferences for geofence service notifications and the like, or other desired information relating to the cardholder to provide the geofence services. In contemplated embodiments, the enrollment includes opt-in informed consent of users to data usage by the system consistent with consumer protection laws and privacy regulations. In some embodiments, the enrollment data and/or other collected data may be anonymized and/or aggregated prior to receipt such that no personally identifiable information (PII) is received. In other embodiments, the system may be configured to receive enrollment data and/or other collected data that is not yet anonymized and/or aggregated, and thus may be configured to anonymize and aggregate the data. In such embodiments, any PII received by the system is received and processed in an encrypted format, or is received with the consent of the individual with which the PII is associated. In situations in which the systems discussed herein collect personal information about individuals including cardholders or merchants, or may make use of such personal information, the individuals may be provided with an opportunity to control whether such information is collected or to control whether and/or how such information is used. In addition, certain data may be processed in one or more ways before it is stored or used, so that personally identifiable information is removed.

The cardholder enrollment may also include merchant segments and types in which the customer has an interest (or lack of interest) so as to avoid nuisance operation of the system with respect to that individual cardholder. For example, a male cardholder may choose to not receive notifications or incentive offers from a female clothier merchant, or a cardholder may choose to opt out of any notifications and offers from a clothier merchant. As another example, a cardholder may choose to accept offers from an electronics store merchant but not from a craft store merchant. Various different cardholder preferences and corresponding selections are possible for acceptance by the geofence host computing device 302 in order to create a cardholder profile for reference in providing the geofence services to meet the particular preferences of enrolled cardholders.

The services provided by the geofence host computing device 302 is contemplated as an opt-in service such that only specifically enrolled cardholders may experience such services. Permission to utilize location services in the cardholder device 310 may be obtained as part of the enrollment process. Such opt-in consent may be made in any manner desired and accepted by the geofence host computing device 302. In some embodiments, the opt-in consent may be made through a digital wallet service or application residing on the cardholder device 310, and a digital wallet service may provide the cardholder portal 312 shown in FIG. 3. More than one cardholder portal 312 is possible, however, using different devices of the cardholder. The cardholder portal 312 may be the same portal provided for other purposes to allow the cardholder to check payment card transaction activity, review account balances, review payment history, dispute charges, etc. or alternatively may be a unique portal specific to the geofence host computing device 302.

Once a cardholder is enrolled, cardholder information is stored in the enrolled customer database 304. As payment card transactions are made and processed by the payment network 100, the geofence host computing device 302 can retrieve information from the enrolled customer database 304 in order to identify a payment-by-card transaction made by an enrolled cardholder and also determine whether or not the payment-by-card transaction relates to an enrolled merchant to provide the geofence services. For example, the geofence host computing device 302 may compare a primary account number (PAN) of a payment-by-card transaction from, for example, the payment processor 106 in the payment network 100 as a payment-by-card transaction is completed to see if it corresponds to the PAN of an enrolled cardholder in order to make such a determination. Preferences and cardholder profile information may also be retrieved for purposes of notice generation (or lack thereof) by the geofence host computing device 302.

A merchant 110 using the merchant computing device 314 may enroll as a participating merchant in the geofence host computing device 302. Merchant enrollment may include acceptance of geofence service terms, and acceptance of merchant profile information for use by the geofence host computing device 302. The merchant profile may include the merchant name and location(s) of their stores, applicable market segment identifiers and descriptors (e.g., grocery, sporting goods, restaurant, cinema), applicable geofence information, affiliate merchant information (by name and location), and affiliate agreement information. The geofence host computing device 302 will generate notices to enrolled cardholders relating only to identified affiliate merchants of an enrolled merchant, and will only operate in accordance with the terms of an affiliate agreement agreed to by each merchant.

Enrolled merchant incentive preferences may also be accepted for use by the geofence host computing device 302 in providing the geo-services. For example, instead of offering the same incentive at all times, an enrolled merchant may choose to activate the geo-services only on certain days or during certain times within a business day, or to change or alter the notices or incentives based on the time of day that they are generated. For example, a participating restaurant may choose to offer 10% off of a lunch order relating to a transaction with another participating merchant that is made between the hours of 11:00 am and 1:00 pm, while offering 25% off a dinner order relating to a transaction with another participating merchant that is made between the hours of 5:00 and 7:00. Likewise, the participating restaurant can choose to offer lunch and dinner discounts order relating to a transaction with another participating merchant that is made on a Tuesday, Thursday and Saturday, but not on Monday, Wednesday or Friday.

As further examples, a franchise owner of multiple stores may offer incentives at some stores but not at others to drive customer traffic to specific ones of their stores. A franchise owner may also offer incentives at different stores relating to transactions with another participating merchant that is made on different days. A cinema may offer a ticket discount anytime, but may exclude new releases. A merchant may allow affiliate merchant offers only for transaction with another participating merchant that exceed a predetermined value. Considerable flexibility and sophistication is possible to accommodate the needs and interests of all types of merchants. The offers may be limited in time or otherwise restricted in any manner desired.

Once a merchant is enrolled, merchant information is stored in the enrolled merchant database 306 for use by the geofence host computing device 302 to provide geofence services.

In operation, the geofence host computing device 302 receives information from the card processor 106 as payment-by-card transactions are made. Referencing the enrolled customer database 304, the geofence host computing device 302 can identify whether a transaction relates (or not) to an enrolled cardholder and an enrolled merchant. If the transaction does not relate to an enrolled cardholder and an enrolled merchant the geofence host computing device 302 takes no further action and proceeds to analyze the next transaction.

If a given transaction does relate to an enrolled cardholder and an enrolled merchant the geofence host computing device 302 determines the cardholder location and compares it to the merchant location to make sure that the cardholder is actually physically present in the area and may benefit from the geofence services provided. For example, if a given transaction processed by the payment processor 106 relates to a card-not-present transaction wherein the cardholder and the merchant are in different geographic areas (e.g., if the cardholder location and the merchant location are hundreds of miles apart) the geofence services are neither needed nor desired and are therefore not provided. Accordingly, if the cardholder is found to be in a location outside of the geofenced area for the enrolled merchant involved in the transaction, the geofence host computing device 302 takes no further action and proceeds to analyze the next transaction.

If the determined cardholder location matches (or closely matches) the merchant's location, the geofence host computing device 302 can know that the cardholder is within the geofenced area and accordingly may benefit from the geofence services. The geofence host computing device 302 proceeds to generate a notice including an offer from one or more affiliate merchants in the geofenced area according to the enrolled merchant's profile in the database 306 and/or applicable terms of the affiliate agreement database 308. The generated offer is stored and the geofence host computing device 302 awaits to see if another transaction from the enrolled cardholder appears from one of the affiliate merchants.

If the geofence host computing device 302 detects a transaction between the enrolled cardholder and one of the affiliate merchants corresponding to a generated offer previously made, the geofence host computing device 302 determines the appropriate affiliate fee and submits it to the payment network 100 for processing. Once approved, the affiliate fee is charged to the affiliate merchant and paid to the enrolled merchant for the initial transaction. The affiliate fee is computed according to the terms of the affiliate agreement between the enrolled merchant and the affiliate merchant.

Affiliate agreement information is stored in the affiliate agreement database 308. The affiliate agreement information may be accepted through the merchant portal 316 or in another manner as desired. The affiliate agreement information includes dynamic parameters needed by the geofence host computing device 302 to compute the applicable affiliate fees when a cardholder redeems an offer generated by the geofence host computing device 302. In contemplated embodiments, the affiliate fee may be a royalty-type value of the transaction with the affiliate merchant (e.g., 5% of the subsequent transaction related to the previously generated offer) or may be constant amount (e.g., $5.00). Regardless, the fee amount may be dynamically adjusted to reflect the likelihood that the generated offer actually caused the subsequent affiliate merchant transaction and/or the relative value of the generated offer to the affiliate merchant.

In one aspect, the dynamic affiliate fee parameters include a consideration of a geographic proximity or distance between the location of the initial transaction with the first merchant and the location where the generated offer was redeemed at the second merchant. The closer the geographic locations between the two enrolled merchants, the more likely it is that the generated offer actually caused the cardholder to make the transaction with the affiliate merchant. On the other hand, the farther the geographic locations between the two merchants, the less likely it may be that the generated offer actually caused the cardholder to make the transaction with the affiliate merchant. As such, and for example, if the affiliate merchant is 100 yards away from the enrolled merchant where the initial transaction was made, the enrolled merchant may receive 100% of the fee contemplated in the affiliate agreement when the generated offer is redeemed at the second merchant, whereas if the affiliate merchant is seven miles away the enrolled merchant may receive 50% of the fee contemplated in the affiliate agreement.

In another aspect, the dynamic affiliate fee parameters include a consideration of timing proximity between when the affiliate merchant offer was generated and when the affiliate merchant offer was redeemed. The less time before the offer was redeemed at the affiliate merchant, the more likely it may be that the offer actually caused the cardholder to make the transaction with the affiliate merchant. On the other hand, the longer it takes for the offer to be redeemed, the less likely it may be that the offer actually caused the cardholder to make the transaction with the affiliate merchant. As such, and for example, if the affiliate merchant offer is redeemed within one hour at the second merchant, the first merchant may receive 100% of the fee contemplated in the affiliate agreement, whereas if the affiliate offer is redeemed two days later the enrolled merchant may receive 50% of the fee contemplated in the affiliate agreement.

In another aspect, the dynamic affiliate fee parameters include a consideration of market segments of the enrolled merchant where the initial transaction was made and the affiliate merchant where a subsequent transaction is made. The less market segment relation between the initial merchant and the second affiliate merchant, the more likely it may be that the offer actually caused the cardholder to make the transaction with the affiliate merchant. On the other hand, the greater the market segment relation between the initial merchant and the affiliate merchant, the less likely it may be that the offer actually caused the cardholder to make the transaction with the affiliate merchant. As such, and for example, if the enrolled merchant is an electronics retailer and the affiliate merchant is a restaurant, the enrolled merchant may receive 100% of the fee contemplated in the affiliate agreement, whereas if the enrolled merchant is an electronics retailer and the affiliate merchant is a cellular phone store, the enrolled merchant may receive 50% of the fee contemplated in the affiliate agreement as the two transactions were probably related and the second transaction may have occurred regardless of whether the affiliate merchant offer had been made.

In general, the merchant enrollment is completed in a manner that allows a merchant to exclude its direct competitors, or the system is otherwise configured to avoid making an affiliate merchant offer to a competing merchant. For example, a payment-by-card transaction with an enrolled electronic store merchant should not trigger a notice including an offer to another electronic store merchant.

Also, the system is preferably configured to avoid making an affiliate merchant offer that may simply seem out of place, inappropriate, or confusing to a cardholder. For example, a payment-by-card transaction at a hardware store should probably not trigger an offer for a discounted dress from a female clothier. Likewise, a payment-by-card transaction at a toy store should probably not trigger an offer from a wine store or cigar store. Instead, the system should intelligently match offers generated with some reasonable correlation to the initial transaction such that it may be perceived as helpful to the cardholder. Such intelligent offer generation and correlation may be made in reference to cardholder profile information, transaction history for individual cardholders, particular cardholder locations, and patterns or trends exhibiting applicable cardholder behavior and preferences.

In generating offers and in determining appropriate affiliate fees, further considerations may provide further sophistication in the geofence host computing device 302. For example, the transaction amount of the first or initial transaction with an enrolled merchant may be considered in generating an offer (or not) for certain affiliate merchants. As one example of this type, a $50.00 purchase at an art gallery may not trigger an affiliate merchant offer for a luxury apparel store, while a $5000 purchase from the same art store may trigger an offer from a luxury apparel store. As another example, a $50 purchase from a discount clothing retailer should probably not trigger an offer from a limousine service that is far more expensive, although a $1500 purchase from a tuxedo retailer might appropriately trigger an offer from the from a limousine service. Likewise, a $10 purchase from a bookstore should probably not trigger an offer from a high-priced, five star restaurant. Intelligent offer generation and correlation may be made by the system in reference to merchant profile information, transaction history for each merchant, and patterns or trends exhibiting applicable cardholder behavior and preferences with respect to those merchants.

The specific goods or services purchased in the initial transaction may also be a consideration for the geofence host computing device 302. For example, if the initial transaction was for piano sheet music, an offer from a piano tuning service may be welcomed and appreciated by a cardholder. Likewise, if the initial transaction involved kennel services for pets, an offer from a nearby pet store may be welcomed and appreciated. If the initial purchase related to a car wash, an offer from a nearby gas or service station may be appreciated. Such intelligent offer generation and correlation may be made by the system in reference to a cardholder profile, merchant profile information, transaction history, and patterns or trends exhibiting applicable cardholder behavior and preferences.

According to the examples above, various levels of information sharing may be made between the payment card network 100 and enrolled merchants, via the geofence host computing device 302 for the benefit of all involved. On a basic level, affiliate merchants will learn that prior transactions with common cardholders were made with other enrolled merchants (but not necessarily the value of transactions with other merchants or the specific items or services purchased). Likewise, merchants of an initial transaction will learn that subsequent transactions were made with other enrolled merchants (but not necessarily the value of transactions with other merchants or the specific items or services purchased). Such information may provide insight into each enrolled merchant's customer traffic relative to other nearby merchants or specific patterns or trends regarding their own customer's behavior.

If transaction amounts are shared between enrolled merchants and affiliated merchants, further insights are possible for the merchants to understand their mutual customer base. Merchants may choose to share such information with some merchants but not with others based on market segmentation or other business factors.

Finally, if transaction data regarding specific goods and services are shared the merchants may refine their use of the geofence host computing device 302 and optimize its returns. For example, participating merchants may refine their merchant profiles, adjust their geofence preferences, or re-negotiate their affiliate agreements in view of a greater understanding of the effectiveness and/or the monetary value provided by the geo-incentive services provided.

Regardless of the level of shared transaction information, consumer protection laws and privacy regulations are to be respected by the network 100. Certain types of consumer data may accordingly not be shared without consent of system users, which as mentioned above may be obtained as part of the system enrollment. The network 100 can provide as much information as cardholders may permit, or that merchants are willing to share, with appropriate sensitivity to providing no more information than is necessary for the benefits of the systems to be realized. For example, transaction data may be shared regarding the number of cardholders that have conducted transactions with each merchant in relation to incentive offers generated, without revealing the identity of those cardholders to each merchant or otherwise sharing information that would allow them to be identified.

Alerts, messages and notifications can be automatically generated to each enrolled cardholder as payment-by-card transactions are made with an enrolled merchant and an affiliate merchant offer is identified as in the examples above. Cardholders that are not enrolled may conduct transactions as before without receiving the geo-services and without any transaction data being shared, and enrolled cardholders may conduct transactions from non-enrolled merchants without receiving the geo-services and without any transaction data being shared. Subject to the terms of cardholder and merchant profiles, and applicable affiliate merchant agreements, enrolled cardholders conducting transactions with enrolled merchants may or may not receive generated affiliate merchant offers, and may or may not result in any sharing of transaction data.

As demonstrated in the examples above, different cardholders making a payment-by-card transaction with the same enrolled merchant may receive the same or different offers from the same or different affiliate merchants depending on the applicable profiles and preferences. Likewise, a first enrolled cardholder may receive multiple affiliate merchant offers in response to an initial transaction with an enrolled merchant, while a second enrolled cardholder may not receive an affiliate merchant offer at all depending on the respective preferences of the first and second cardholders as well as enrolled merchant profiles and preferences. The system is capable of unique, customized response to each enrolled cardholder on a transaction-by-transaction basis with each enrolled merchant in a geofenced area.

Figure 4:
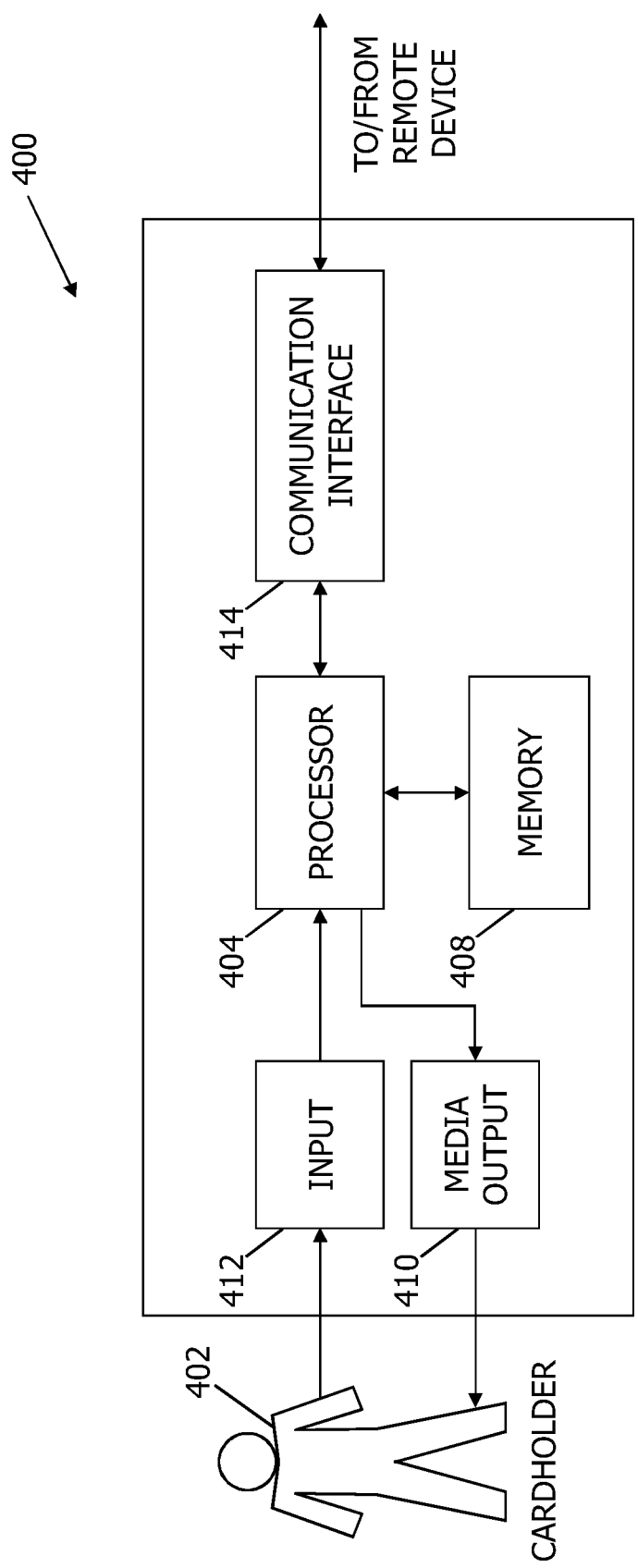
FIG. 4 illustrates an example configuration of a user device for the system shown in FIGS. 1-3.

FIG. 4 illustrates an example configuration of a device 400 operated by a user 402, such as any of the parties described above. User device 400 may include, but is not limited to, a smart phone, a tablet, a notebook or laptop computer, a desktop computer, and a website. In the example embodiment, device 400 includes a processor 404 for executing instructions. In some embodiments, executable instructions are stored in a memory area 408. Processor 404 may include one or more processing units, for example, a multi-core configuration. Memory area 408 is any device allowing information such as executable instructions and/or written works to be stored and retrieved. Memory area 408 may include one or more computer readable media.

The device 400 may also include at least one media output component 410 for presenting information to user 402. Media output component 410 is any component capable of conveying information to user 402. In some embodiments, media output component 410 includes an output adapter such as a video adapter and/or an audio adapter. An output adapter is operatively coupled to processor 404 and operatively couplable to an output device such as a display device, a liquid crystal display (LCD), organic light emitting diode (OLED) display, or "electronic ink" display, or an audio output device, a speaker or headphones.

In some embodiments, the device 400 includes an input device 412 for receiving input from user 402. Input device 412 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 410 and input device 412. The device 400 may also include a communication interface 414, which is communicatively couplable to a remote device in the card payment system network or with other remote devices via networks other than the payment system. Communication interface 414 may include, for example, a wired or wireless network adapter or a wireless data transceiver for use with a mobile phone network, Global System for Mobile communications (GSM), 3G, or other mobile data network or Worldwide Interoperability for Microwave Access (WIMAX), or an 802.11 wireless network (WLAN).

Stored in memory area 408 are, for example, computer readable instructions for providing a user interface to user 402 via media output component 410 and, optionally, receiving and processing input from input device 412. A user interface may include, among other possibilities, a web browser and client application. Web browsers enable users, such as user 402, to display and interact with media and other information typically embedded on a web page or a website. An application allows user 402 to interact with a server application from a server system.

Multiple user devices 400 are contemplated and respectively provided for use by cardholders, representatives of the issuer, representatives of the payment processor, representatives of the merchant bank, representatives of merchants, and representatives of the geofence host device to effect the system as shown in FIG. 3. Additional and/or alternative users and user devices may be provided, however, as desired for use with the system.

In a variety of contemplated examples, different combinations of user devices, being the same or different from one another, may be utilized in the system with otherwise similar effect. One or more of the user devices may be a mobile device, such as any mobile device capable of interconnecting to the Internet including a smart phone, personal digital assistant (PDA), a tablet, or other web-based connectable equipment. Alternatively, one or more of the user devices may be a desktop computer or a laptop computer. Each of the user devices may be associated with a different user as described. Each user device may be interconnected to the Internet through a variety of interfaces including a network, such as a local area network (LAN) or a wide area network (WAN), dial-in connections, cable modems and special high-speed ISDN lines.

Figure 5:
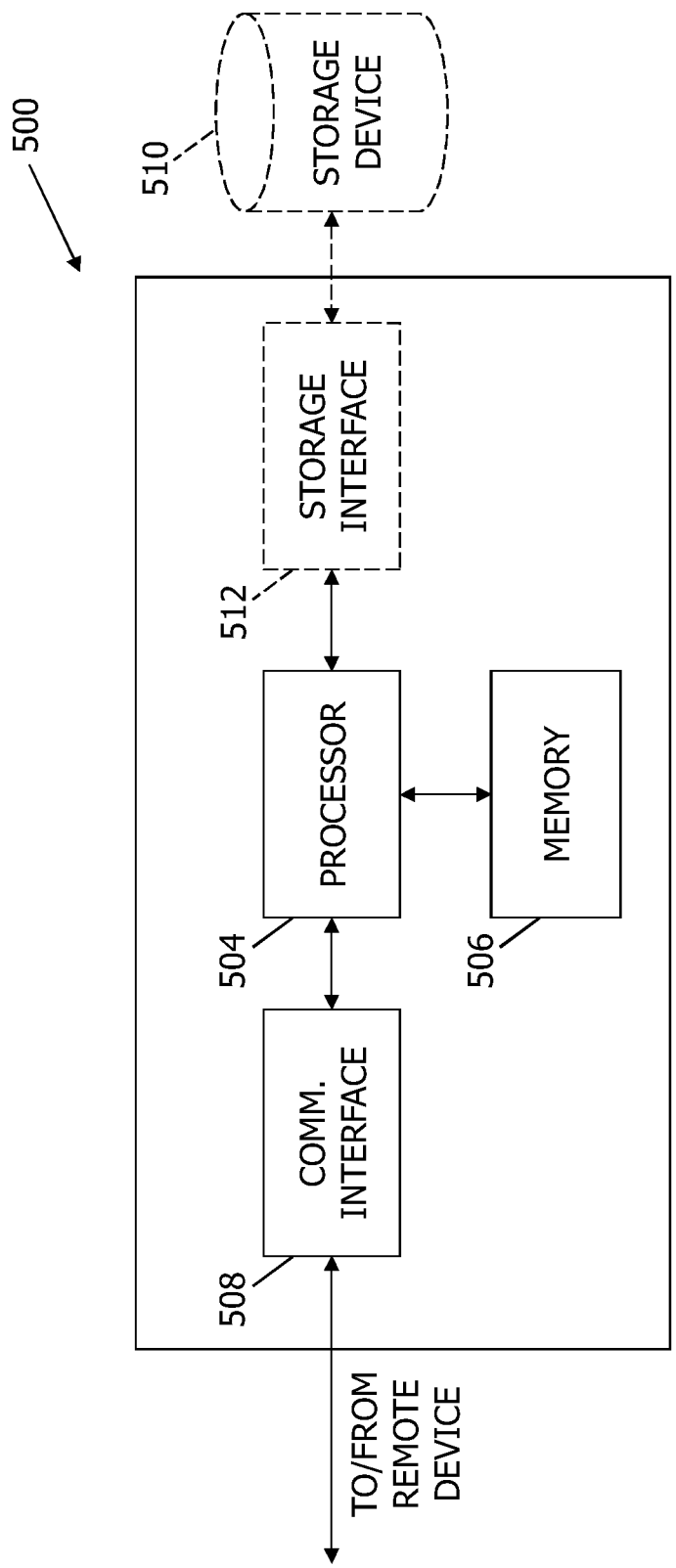
FIG. 5 is a schematic diagram of an example server computing device that may be used with the computer system shown in FIG. 3.

FIG. 5 illustrates an example configuration of a geofence computing device 500 that confers the geo-incentive services described above. The computing device 500 is sometimes referred to herein as a server-based network "host" device that coordinates and manages the geofencing, generates affiliate merchant incentive offers, and administrates affiliate merchant fee agreements, although it is not strictly necessary in all embodiments that the host computing device is a server system.

As shown in FIG. 5, the geofence host computing device 500 includes a processor 504 for executing instructions. Instructions may be stored in a memory area 506, for example. Processor 504 may include one or more processing units (e.g., in a multi-core configuration).

Processor 504 is operatively coupled to a communication interface 508 such that geofence host computing device 500 is capable of communicating with a remote device such as a merchant portal, an issuing portal, a delivery carrier portal, or a payment processor. For example, communication interface 508 may receive or transmit transaction data, enrolled cardholder data, enrolled merchant data, affiliate agreement data, etc. to the cardholder portal, merchant portal, a payment processor, and/or another client device via a network.

Processor 504 may also be operatively coupled to a storage device 510. Storage device 510 is any computer-operated hardware suitable for storing and/or retrieving data. In some embodiments, storage device 510 is integrated in geofence host computing device 500. For example, geofence host computing device 500 may include one or more hard disk drives as storage device 510. In other embodiments, storage device 510 is external to geofence host computing device 500 and may be accessed by a plurality of server computer devices. For example, storage device 510 may include multiple storage units such as hard disks or solid state disks in a redundant array of inexpensive disks (RAID) configuration. Storage device 510 may include a storage area network (SAN) and/or a network attached storage (NAS) system.

The storage device 510 may include a database server and database which contains information and transaction data for enrolled cardholders, enrolled merchants, and affiliate fee agreements, and geofenced areas. In one embodiment, the database is centralized and stored on the server system 500. In an alternative embodiment, the database is stored remotely from the server system 500 and may be non-centralized. The database may store transaction data including data relating to merchants, merchant locations, cardholders, cardholder location, and affiliate fee agreements and accounting.

In some embodiments, processor 504 is operatively coupled to storage device 510 via a storage interface 512. Storage interface 512 is any component capable of providing processor 504 with access to storage device 510. Storage interface 512 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 504 with access to storage device 510.

Memory area 506 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
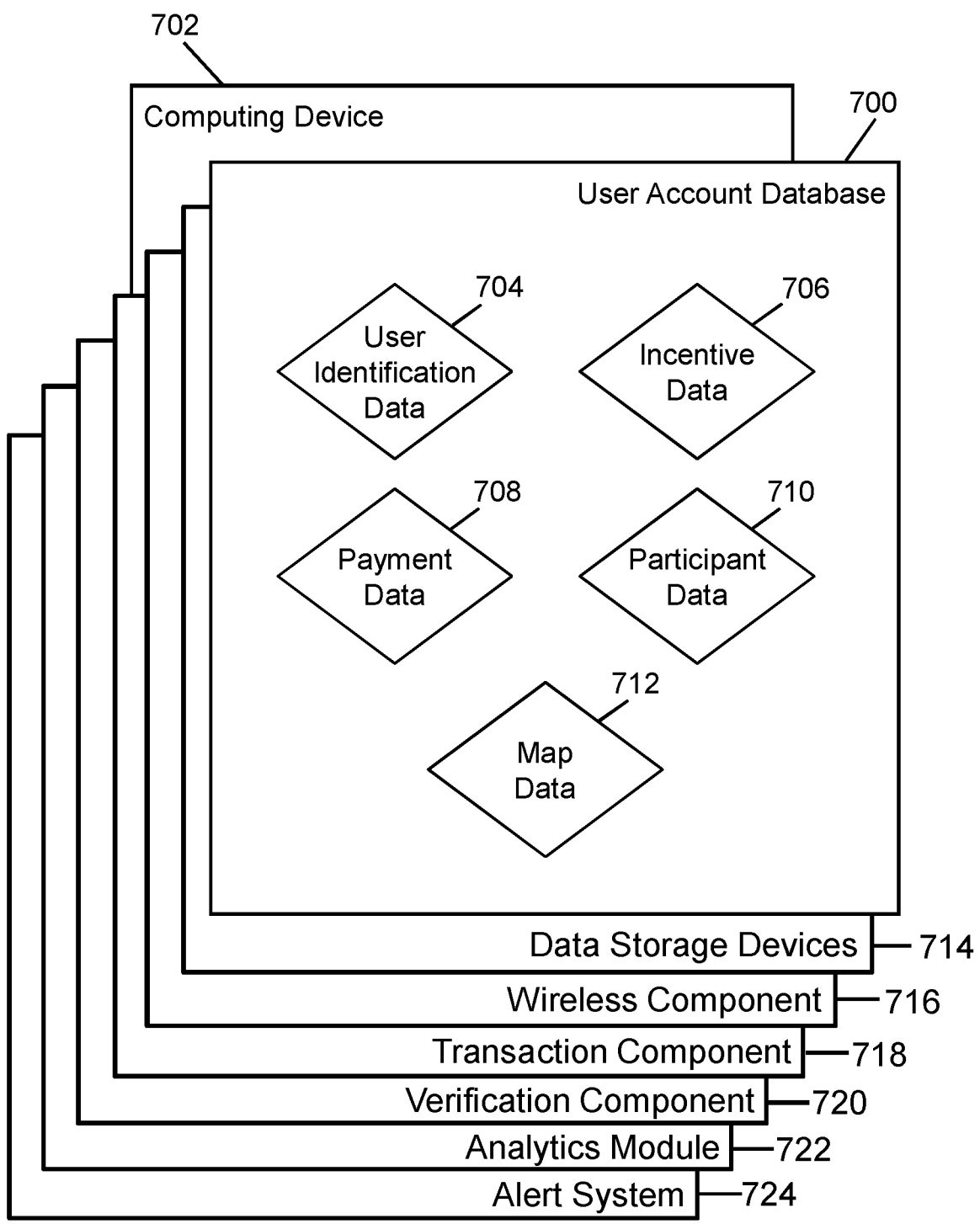
FIG. 6 shows an example configuration of a user account database within a computing device, along with other related computing components, that may be used to create, organize, and monitor a plurality of user data associated with a user.

FIG. 6 shows an example configuration of a user account database 700, within a computing device 702, along with other related computing components, that may be used to create, organize, and monitor a plurality of user data associated with a user account. In some embodiments, computing device 702 is the same or similar to server system 500. User account database 700 is coupled to several separate components within computing device 702, which perform specific tasks.

In the example embodiment, database 700 includes user identification data 704, geofence incentive data 706, payment data 708, participant data 710, and map data 712. In contemplated embodiments, user identification data 704 includes, but is not limited to, a user name, a user address, and a user phone number. Geofence incentive data 706 includes geofence information, enrolled cardholder data, merchant data, and affiliate fee agreement data needed to generate incentive offers and process the dynamic affiliate merchant fees described above. Payment data 708 includes, but is not limited to, card information, payment history, and a billing address. Participant data 710 includes information associated with participating merchants, including merchant identifiers, address information, contact information, etc. Map data 712 includes data associated with geofencing.

Computing device 702 includes the database 700, as well as data storage devices 714. Computing device 702 also includes a wireless component 716 and a transaction component 718 for correlating, for example, payment card transactions. An analytics module 722 is included for analyzing transactions, enrollment status, incentive offers generated, incentive offers redeemed, affiliate fee payment determination, and other items of interest. Further included is a verification module 720 that may communicate with a device in the payment network or another device, and an alert module 724 for transmitting an alert to a cardholder, merchant or any other party.

Figure 7:
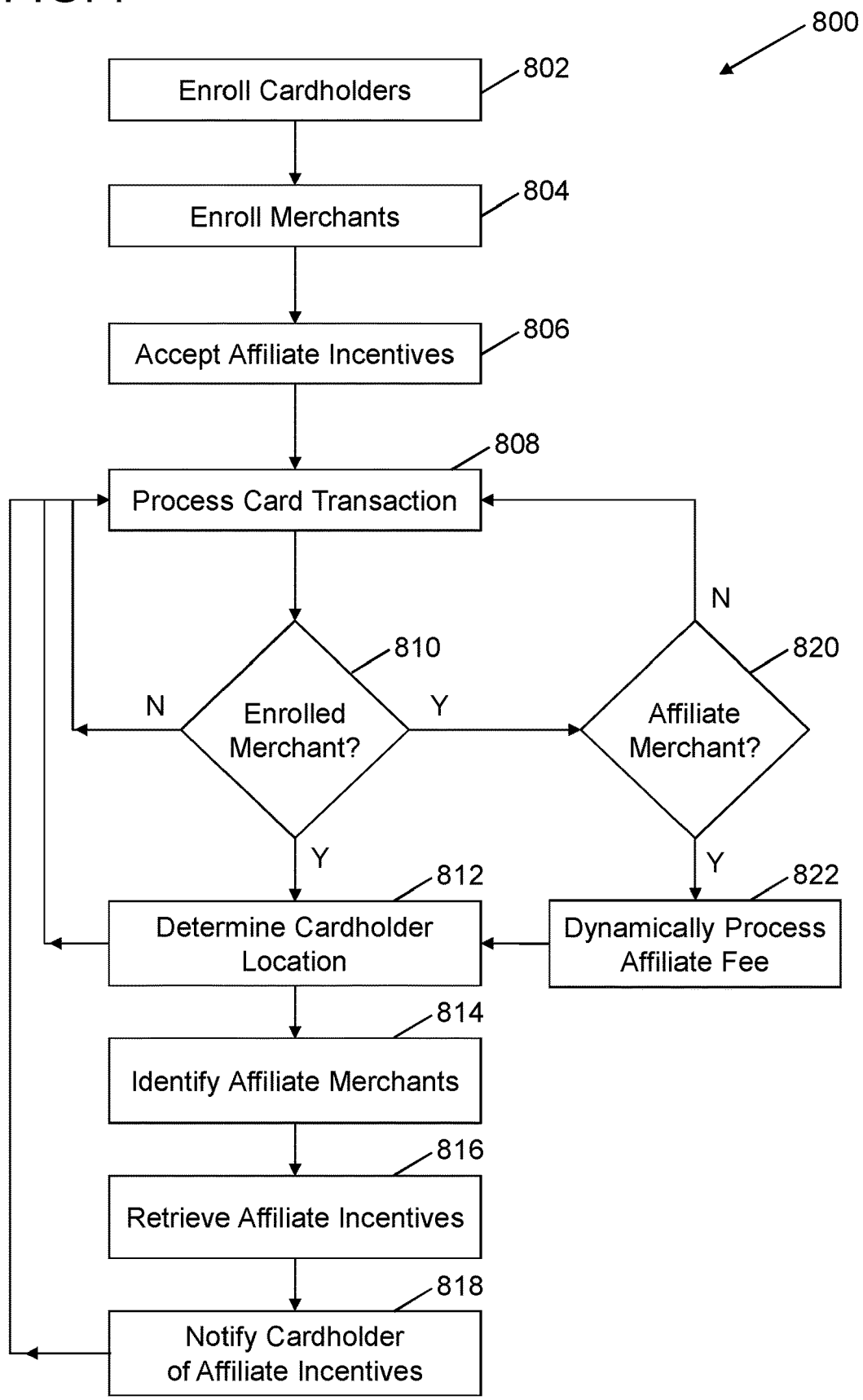
FIG. 7 shows an exemplary process of geographic merchant incentive notification for the system shown in FIG. 3.

FIG. 7 shows an exemplary process 800 of geographic inventive generation, notification and processing for the system 300 shown in FIG. 3.

At step 802, cardholders are enrolled. As contemplated, the enrollment includes opt-in informed consent consistent with application consumer protection and privacy laws and regulations. Cardholder profiles and preferences are accepted by the system as part of the enrollment. Also, as part of the enrollment step, cardholders may consent to use of location of services on a cardholder device in relation to the system 300. An app may be made available for cardholders to download on their cardholder devices (e.g., smartphones) for convenient entry, review, and updates to their personal profile and settings or preferences for the geo-services provided. Otherwise, cardholders may access the system via a portal for initial enrollment, to check status, or change or update profiles, preferences or settings for the geo-services.

At step 804, merchants are enrolled. Merchant enrollment may include acceptance of geofence information for a merchant location or locations, merchant profiles and preferences such as those described above. Affiliate merchant agreement information described above for use by the system 300 is also accepted at step 806. An app may be made available for merchants to download on their merchant devices (e.g., smartphones) for convenient entry, review, and updates to their merchant profile and settings or preferences for the geo-services provided. Otherwise, merchants may access the system via a portal for initial enrollment, check status, or change or update their profiles, preferences or settings for the geo-services.

At step 808, payment-by-card transactions are processed in a conventional manner. At step 810, the transaction data is analyzed to determine if a processed transaction was made by an enrolled cardholder. For example, the system may compare a primary account number (PAN) of a processed transaction to see if matches a PAN of an enrolled cardholder.

If the transaction data does not relate to an enrolled cardholder, the system does nothing further and returns to continue processing payment-by-card transactions at step 808.

If the transaction data does relate to an enrolled cardholder, the system at step 812 determines the cardholder location to make sure that the cardholder is within the geofenced area of the merchant location and not somewhere else. Location services of a cardholder device may be used to make the determination at step 812. If the cardholder is outside the geofenced area, the system presumes that the transaction is a card-not-present transaction made remotely by the cardholder, and the system may return to continue processing payment-by-card transactions at step 808.

If the cardholder is in the geofenced area, and more specifically at the location of the merchant corresponding to the transaction, the system at step 814 identifies affiliate merchants, retrieves affiliate incentives at step 816, and notifies the cardholder at step 818. The system then returns to continue processing payment-by-card transactions at step 808.

As shown at step 820, as transactions involving enrolled cardholders are identified, the system further analyzes whether the transaction involves an affiliate merchant corresponding to an incentive offer made earlier at step 818. To do so, the transaction data may be compared, for example, to identify transactions involving different merchants in the same geofenced area that include a matching PAN of an enrolled cardholder to whom an offer was sent in the geofenced area. The incentive offers may in some cases include an electronic bar code, a QR code, or another code or machine readable element that may be scanned by a point of sale device of the nearby retailer when the incentive offer is redeemed to ensure that the discount or other special offer is applied to an eligible purchase. Information corresponding to the machine readable element included in the offer may be communicated to the multi-party payment card processing network 100 as part of the transaction data to identify redeemed offers. As such, redeemed offers can be identified even when a cardholder does not use their payment card to redeem an offer. For example, when a customer uses a different payment card than the initial transaction or when the cardholder tenders a cash payment to redeem the offer the system can nonetheless recognize the redeemed offer.

If a transaction is found to involve an affiliate merchant corresponding to an incentive offer made earlier at step 818, the system at step 822 dynamically determines and processes the affiliate fee in the proper amount, and again determines cardholder location at step 812 to see if the merchant is in the geofenced area of the affiliate merchant. If so, additional affiliate merchants may be identified, incentives may be retrieved and notifications may be generated per steps 814, 816 and 818.

If the transaction at step 820 does not relate to an affiliate merchant from a previously generated incentive offer, the system returns to continue processing payment-by-card transactions at step 808.

Steps 808 through 822 are performed iteratively as payment-by-card transactions are processed. Since the processing of transactions is rapidly performed, affiliate merchant incentive notifications are generated in a practically instantaneous manner from the cardholder perspective. The cardholder may receive and review the notification before leaving the merchant location where a payment-by-card transaction was made. The notification may include affiliate merchant incentive offers, phone numbers of affiliate merchant, or directions to the affiliate merchant from the cardholder's present location so that the cardholder can quickly decide whether to proceed to an affiliate merchant to redeem the offer. Beneficially, the cardholder need not be familiar with the geographic area or have prior knowledge that an affiliate merchant even existed in order to beneficially make a second transaction within the geofenced area.

As the cardholder travels about, transactions may be made in different geofenced areas with enrolled merchants, triggering additional and different affiliate merchant offers unique to each geofenced area. If the generated offers are followed, they may serve to guide a cardholder through an unfamiliar area or otherwise to inform or educate cardholders of merchant options that they otherwise did not know. Location-based incentive offers may be enjoyed by cardholders wherever they conduct payment card transactions with enrolled merchants.

Meanwhile, enrolled merchants can beneficially earn dynamic revenue streams via their affiliate agreements with other nearby merchants in their respective geofenced areas as well as gain further insights into their customer bases relative to other nearby merchants. The system automatically determines the affiliate fees and processes them for payment without action by the enroller merchants. The may store information and generate reports of incentive offers made, incentive offers redeemed, and affiliate fee determinations for merchants to analyze and optimize their use of the system.

As will be appreciated based on the foregoing specification, the above-described embodiments of the disclosure may be implemented using computer programming or engineering techniques including computer software, firmware, hardware or any combination or subset thereof, wherein the technical effects described above are achieved. Any such resulting program, having computer-readable code means, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electronic payment card processing system comprising:
at least one host computing device comprising at least one processor in communication with a memory device; and a multi-party payment processing network for processing payment-by-card transactions,
wherein the multi-party payment processing network comprises a payment processor configured to:
process a first authorization message on behalf of a first merchant, the first authorization message associated with a first transaction initiated by a cardholder at a first location of the first merchant, the first authorization message including transaction data associated with the first transaction; and
transmit the transaction data of the first authorization message to the at least one host computing device, and
wherein the at least one processor of the at least one host computing device is configured to:
receive a request to enroll the first merchant in an incentive service, the request including a geofenced area that includes at least the first location of the first merchant;
identify, from a lookup within a database, a second merchant having a first location within the geofenced area;
link, within the database, the first merchant and the second merchant as part of the incentive service, the linking including the geofenced area that includes at least the first location of the first merchant and the first location of the second merchant;
receive the transaction data from the first authorization message from the payment processor via the multi-party payment processing network;
perform a lookup, within the database in real-time, upon receiving the transaction data from the first authorization message, for the link between the first merchant and the second merchant;
receive, in real-time from a mobile computing device associated with the cardholder via a computer network different from the multi-party payment processing network, a current location of the cardholder, the current location provided by location services executing on the mobile computing device;
compare the current location of the cardholder to the geofenced area;
in response to determining that the current location of the cardholder is within the geofenced area based on the comparison, generate a notification message including data associated with one or more incentive offers offered by the second merchant; and
push, in real-time via the computer network, the notification message to the mobile computing device.

2. The system of claim 1, wherein the at least one processor is further configured to:
cause to be displayed on the mobile computing device, using the notification message, a machine readable element including information associated with the one or more incentive offers, the machine readable element configured to be used in a second transaction with the second merchant.

3. The system of claim 1, wherein the at least one processor is further configured to:
receive a second authorization message via the multi-party payment processing network, the second authorization message associated with a second transaction initiated by the cardholder at the second merchant;
identify, from the database, the link between the first merchant and the second merchant; and
dynamically determine, in response to identifying the link, an affiliate fee payable from the second merchant to the first merchant.

4. The system of claim 1, wherein the first authorization message is compliant with a communications standard governing message types, data elements, and code values of the first authorization message, wherein the first authorization message is compliant with at least one of international organization for standardization (ISO) 8583 or ISO 20022, and wherein the first authorization message is addressed to an issuer of an account proffered for transactions and is received in real time with respect to the proffer.

5. The system of claim 1, wherein the at least one processor is further configured to:
dynamically determine an affiliate fee based on at least one of:
i) a time interval between the first authorization message and a second authorization message associated with the second merchant, wherein a longer time interval results in a first reduction of the affiliate fee,
ii) a geographic distance between the first merchant and the second merchant, wherein a larger geographic distance results in a second reduction of the affiliate fee, or
iii) a first market segment associated with the first authorization message and a second market segment associated with the second authorization message, wherein if the first market segment is the same as the second market segment, the affiliate fee is reduced.

6. The system of claim 1, wherein the at least one processor is further configured to:
cause to be displayed on the mobile computing device the notification message via a digital wallet application executing on the mobile computing device.

7. The system of claim 1, wherein the at least one processor is further configured to:
in response to receiving the first authorization message, perform a lookup within the database in real-time using the transaction data, for a stored cardholder identifier matching a cardholder identifier included in the first authorization message; and
determine that the cardholder is enrolled in the incentive service based on the stored cardholder identifier matching the cardholder identifier.

8. The system of claim 1, wherein the at least one processor is further configured to:
determine, based on a look up performed within the database in real-time using the transaction data, whether the cardholder has opted out of at least one of notifications or offers associated with a merchant segment including the second merchant; and
generate, in response to determining that the cardholder has not opted out, the notification message.

9. The system of claim 1, wherein the at least one processor is further configured to:

determine, based on a look up performed within the database in real-time using the transaction data, whether the cardholder has opted out of at least one of notifications or offers associated with a type of merchant including the second merchant; and generate, in response to determining that the cardholder has not opted out, the notification message.

10. A computer-implemented method implemented by at least one host computing device including at least one processor in communication with a memory device and a multi-party payment processing network for processing payment-by-card transactions and including a payment processor, the method comprising:

receiving, by the at least one processor, a request to enroll a first merchant in an incentive service, the request including a geofenced area that includes at least a first location of the first merchant;

identifying, by the at least one processor from a lookup within a database, a second merchant having a first location within the geofenced area;

linking, by the at least one processor within the database, the first merchant and the second merchant as part of the incentive service, the linking including the geofenced area that includes at least the first location of the first merchant and the first location of the second merchant;

processing, by the payment processor, a first authorization message on behalf of the first merchant, the first authorization message associated with a first transaction initiated by a cardholder at a first location of the first merchant, the first authorization message including transaction data associated with the first transaction;

transmitting, by the payment processor, the transaction data of the first authorization message to the at least one host computing device;

receiving, by the at least one processor, the transaction data from the first authorization message from the payment processor via the multi-party payment processing network;

performing a lookup, by the at least one processor within the database in real-time upon receiving the transaction data from the first authorization message, for the link between the first merchant and the second merchant;

receiving, by the at least one processor in real-time from a mobile computing device associated with the cardholder via a computer network different from the multi-party payment processing network, a current location of the cardholder, the current location provided by location services executing on the mobile computing device;

comparing, by the at least one processor, the current location of the cardholder to the geofenced area;

in response to determining that the current location of the cardholder is within the geofenced area based on the comparison, generating, by the at least one processor, a notification message including data associated with one or more incentive offers offered by the second merchant; and pushing, by the at least one processor in real-time via the computer network, the notification message to the mobile computing device.

11. The method of claim 10 further comprising:
causing to be displayed on the mobile computing device, by the at least one processor using the notification message, a machine readable element including information associated with the one or more incentive offers, the machine readable element configured to be used in a second transaction with the second merchant.

12. The method of claim 10 further comprising:
receiving, by the at least one processor, a second authorization message via the multi-party payment processing network, the second authorization message associated with a second transaction initiated by the cardholder at the second merchant;

identifying, by the at least one processor from the database, the link between the first merchant and the second merchant; and dynamically, by the at least one processor, determining, in response to identifying the link, an affiliate fee payable from the second merchant to the first merchant.

13. The method of claim 10, wherein the first authorization message is compliant with a communications standard governing message types, data elements, and code values of the first authorization message, wherein the first authorization message is compliant with at least one of international organization for standardization (ISO) 8583 or ISO 20022, and wherein the first authorization message is addressed to an issuer of an account proffered for transactions and is received in real time with respect to the proffer.

14. The method of claim 10 further comprising:
dynamically determining, by the at least one processor, an affiliate fee based on at least one of:
i) a time interval between the first authorization message and a second authorization message associated with the second merchant, wherein a longer time interval results in a first reduction of the affiliate fee,
ii) a geographic distance between the first merchant and the second merchant, wherein a larger geographic distance results in a second reduction of the affiliate fee, or
iii) a first market segment associated with the first authorization message and a second market segment associated with the second authorization message, wherein if the first market segment is the same as the second market segment, the affiliate fee is reduced.

15. The method of claim 10 further comprising:
causing to be displayed on the mobile computing device, by the at least one processor, the notification message via a digital wallet application executing on the mobile computing device.

16. A first non-transitory computer readable medium including first computer-executable instructions and a second non-transitory computer readable medium including second computer-executable instructions, wherein when the first computer-executable instructions are executed by a payment processor of a multi-party payment processing network, the first computer-executable instructions cause the payment processor to:
process a first authorization message on behalf of a first merchant, the first authorization message associated with a first transaction initiated by a cardholder at a first location of the first merchant, the first authorization message including transaction data associated with the first transaction; and
transmit the transaction data of the first authorization message to at least one host computing device, and wherein when the second computer-executable instructions are executed by at least one processor of the at least one host computing device, the second computer-executable instructions cause the at least one processor to:

receive a request to enroll the first merchant in an incentive service, the request including a geofenced area that includes at least the first location of the first merchant;

identify, from a lookup within a database, a second merchant having a first location within the geofenced area;

link, within the database, the first merchant and the second merchant as part of in the incentive service, the linking including the geofenced area that includes at least the first location of the first merchant and the first location of the second merchant;

receive the transaction data from the first authorization message from the payment processor via the multi-party payment processing network;

perform a lookup within the database in real-time, upon receiving the transaction data from the first authorization message, for the link between the first merchant and the second merchant;

receive, in real-time from a mobile computing device associated with the cardholder via a computer network different from the multi-party payment processing network, a current location of the cardholder, the current location provided by location services executing on the mobile computing device;

compare the current location of the cardholder to the geofenced area;

in response to determining that the current location of the cardholder is within the geofenced area based on the comparison, generate a notification message including data associated with one or more incentive offers offered by the second merchant; and push, in real-time via the computer network, the notification message to the mobile computing device.

17. The second non-transitory computer readable medium of claim 16, wherein the second computer-executable instructions further cause the at least one processor to:

cause to be displayed on the mobile computing device, using the notification message, a machine readable element including information associated with the one or more incentive offers, the machine readable element configured to be used in a second transaction with the second merchant.

18. The second non-transitory computer readable medium of claim 16, wherein the second computer-executable instructions further cause the at least one processor to:

receive a second authorization message via the multi-party payment processing network, the second authorization message associated with a second transaction initiated by the cardholder at the second merchant;

identify, from the database, the link between the first merchant and the second merchant; and dynamically determine, in response to identifying the link, an affiliate fee payable from the second merchant to the first merchant.

19. The second non-transitory computer readable medium of claim 16, wherein the first authorization message is compliant with a communications standard governing message types, data elements, and code values of the first authorization message, wherein the first authorization message is compliant with at least one of international organization for standardization (ISO) 8583 or ISO 20022, and wherein the first authorization message is addressed to an issuer of an account proffered for transactions and is received in real time with respect to the proffer.

20. The second non-transitory computer readable medium of claim 16, wherein the second computer-executable instructions further cause the at least one processor to:

dynamically determine an affiliate fee based on at least one of:
  i) a time interval between the first authorization message and a second authorization message associated with the second merchant, wherein a longer time interval results in a first reduction of the affiliate fee,
  ii) a geographic distance between the first merchant and the second merchant, wherein a larger geographic distance results in a second reduction of the affiliate fee, or
  iii) a first market segment associated with the first authorization message and a second market segment associated with the second authorization message, wherein if the first market segment is the same as the second market segment, the affiliate fee is reduced.

* * * * *